United States Patent Office 3,284,386
Patented Nov. 8, 1966

3,284,386
VINYL HALIDE RESINS STABILIZED WITH
METALLO-PHOSPHOROUS COMPOUNDS
Gordon M. Juredine, Cleveland Heights, Ohio, assignor to
Synthetic Products Company, Cleveland, Ohio, a corporation of Ohio
No Drawing. Filed Jan. 30, 1963, Ser. No. 255,071
15 Claims. (Cl. 260—23)

This invention relates to compounds useful for the stabilization of vinyl halide polymers, to methods or processes of making said compounds, to compositions including said compounds, and to vinyl halide polymers stabilized with said compounds and compositions. More particularly, it relates to asymmetric alkaline earth metal carboxylate-phosphites, to methods of making said phosphites, to compositions including said asymmetric compounds, and to vinyl halide polymers stabilized with said phosphites.

An important utilization of alkaline earth metal salts is in the fiield of vinyl halide resin additives, where alkaline earths are used rather generally as stabilizers or as components with other materials in stabilizing systems for vinyl resins in the form of carboxylates. These alkaline earth carboxylates produce along with their important stabilizing effects of the metal a more or less degree of incompatibility due to the heretofore unavoidable excess of carboxylate that accompanies the metal, in the vinyl resin compound during its processing and in the finished vinyl plastic product, as evidenced by the migration of unassimilated carboxylate to the surfaces of the vinyl resin compound during curing and processing to cause undesirable plate-out on the carrying equipment and to cause undesirable scum that exudes an exposure and aging of the vinyl plastic to weathering and to case undesirable surface interferences to decorative or utile printing and to heat-sealing of the vinyl plastic. The plate-out is noticed as a mist or as deposits on molds or calender rolls producing molded objects or sheets having imperfect surfaces and requiring a considerable amount of undesired cleaning of molds, casting surfaces, calender rolls and the like. This trouble is due to the presence of two molecular equivalents of carboxylic acid for each mole of alkaline earth metal used as stabilizer. This amount is always an excess over what can apparently be contained compatibly with the needs for the amount of alkaline earth metal by the requirements to stabilize the vinyl resin during processing or in the finished plastic. Formulators and compounders in the vinyl industry have been obliged to contend with this problem whenever they required the presence of an alkaline earth stabilizer, and have made recourse to tedious and complicated correctives to overcome it, not always with assurance of success. If the resin is fused and cured at 350–400° F. or higher, the plate-out is reduced. However, this requires exacting control which is very often impractical in factory operations, and such temperatures even for short times result in some degradation of the vinyl polymer even under the best conditions. Accordingly, it is a primary object of this invention to avoid the difficulties alluded to hereinabove and to provide a new alkaline earth metal salt stabilizer compound for vinyl halide polymers which does not exhibit plate-out over an extended period of time and which does not exhibit undesirable surface scum nor interferences to printing or heat sealing.

Another object of this invention is to provide novel methods for making these alkaline earth salt compounds.

Yet another object is to provide compositions useful for stabilizing vinyl halide polymers and including a novel alkaline earth metal salt stabilizer compound.

A still further object is to provide a new composition of a vinyl halide polymer containing said alkaline earth metal salt compound as a stabilizer and which does not exhibit undesirable plate-out, surface scum or weathering, nor interference to printing or heat sealing.

These and other objects and advantages of the present invention will become more apparent to those skilled in the art from the following detailed description and examples.

According to the present invention, it has been discovered that vinyl halide polymers can be heat stabilized with a compound having the formula

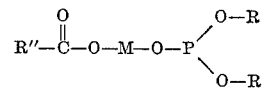

where R and R″ are selected from the group consisting of alkyl, cycloaliphatic, aryl, aralkyl, and alkaryl radicals and their halogen substituted derivatives, where R has from 4 to 18 carbon atoms, where R″ has from 3 to 17 carbon atoms, and where M is selected from the group consisting of barium, calcium and strontium. Moreover, vinyl halide polymers stabilized with these asymmetric alkaline earth metal acid salt-organic phosphite compounds do not exhibit plate-out over extended periods of time, do not show surface scum nor feel slimy to the touch after aging, and do not exhibit undesirable surface interference to satisfactory surface printing or heat sealing as compared to vinyl halide polymers containing the alkaline earth metal carboxylic acid salt alone or with an organic phosphite. Thus, the problems alluded to hereinabove are avoided when these asymmetric alkaline earth metal salt-phosphites are employed in vinyl halide polymers as stabilizers or are employed in conjunction with other materials, such as conventional polyvinyl halide stabilizers of the class of cadmium, zinc and/or tin salts of organic acids with or without organic phosphites, to form stabilizing systems for vinyl halide polymers. Such asymmetric metal salt-phosphites contain only about half of the carboxylic content heretofore accompanying the alkaline earth metal. Although the reaction to produce these asymmetric salts appears to be quantitative, it, of course, is possible that side reactions can occur or that the reactants may not have completely reacted, and small amounts of alkaline earth metal hydroxide, free phosphite, free acid, basic alkaline earth metal carboxylate, and alkaline earth metal dicarboxylate may be present. Thus, approximately overall amounts as from about 0.8 to 1.2 moles of carboxylic acid residue per mole of alkaline earth metal may be present on analysis but are fully compatible for practical purposes during the processing of the vinyl resin and during aging of the vinyl plastic. The selected phosphites employed in the other half of the asymmetric alkaline earth salt to balance the requirement of the alkaline earth metal valency are known to be in themselves compatible in vinyl resins. Mixtures of these new asymmetric stabilizers can be used.

Examples of these asymmetric alkaline earth metal salt-phosphite compounds falling within the scope of this invention are barium butanoate-diphenyl phosphite, barium chlorovalerate-dibutyl phosphite, barium octoate-ditolyl phosphite, barium naphthenate-benzyl methyl phosphite, barium laurate-phenyl tolyl phosphite, barium benzoate-cyclopentyl phenyl phosphite, barium-α-naphthoate-diiodophenyl phosphite, barium naphthenate-octyl phenyl phosphite, calcium octoate-diphenyl phosphite, calcium octoate-octyl phenyl phosphite, calcium octoate-bis(nonyl phenyl) phosphite, calcium laurate-dicyclohexyl methyl phosphite, calcium chloropalmitate-difluorobutyl phosphite, calcium 3-methyl cyclopentyl acetate-butyl phenyl phosphite, calcium phenyl acetate-ditolyl phosphite, calcium isocaproate-tridecyl phenyl phosphite, strontium octoate-octyl phenyl phosphite, strontium stearate-diphenyl phosphite, strontium octoate-bis (nonyl phenyl) phosphite, strontium camphonanate-bromohexyl tolyl phosphite, strontium p-toluate-diphenyl phosphite, strontium benzoate-octyl phenyl phosphite, strontium octoate - dicyclopentyl phosphite, strontium naphthenate-bis (dodecyl phenyl) phosphite, and the like.

These asymmetric alkaline earth metal phosphite salts can readily be prepared by dispersing in a particular diluent and/or solvent the alkaline earth metal hydroxide [Ba(OH)₂, Ca(OH)₂, or Sr(OH)₂, or mixture thereof including their hydrates] and the desired phosphite, and then the required monocarboxylic acid is mixed in this dispersion at room temperature. When the exothermic reaction started reaches its peak, agitation is stopped, and after about one hour, the asymmetric alkaline earth salt herein described is formed. It appears the phosphite itself serves at first as the medium for the reaction of the metal hydroxide with the carboxylic acid, and only after that is formed and some time has elapsed does the phosphite enter the reaction. In addition it appears that the basic metal carboxylate formed thus in the presence of the phosphite is in a condition in which it is much more readily and completely reactive at lower temperature than when it is formed separately.

The phenomena of this method of preparation can be observed readily as a rule, when (1) the solvent and/or diluent, ether and/or hydrocarbon, is present with the phosphite into which the metal hydroxide is dispersed, and/or (2) excess of the phosphite itself is employed as the diluent. In these cases, when the acid is added to the hydroxide dispersion in the phosphite-diluent, within a very few minutes the exothermic reaction raises the temperature of the mixture to its peak and there is usually formed a gel or a hydrous suspension of the basic metal carboxylate in a mass generally too thick to stir. At this point no agitation is attempted, the mass is simply allowed to stand undisturbed, and about an hour later the whole mass becomes fluid and is converted to the asymmetric alkaline earth salt of this invention in a strikingly clear and neutral solution in the diluent. If desired, the gel can be stirred. The time of gellation, i.e., from the time the gel is formed until it dissolves, will vary according to the batch size, reactants, diluents and/or solvents and so forth, so that it may vary from less than an hour to several hours.

In some instances it may not be necessary to apply external heat to the mixture. However, for practical usage, to speed the reaction and to increase the fluidity of the mass, heat is generally applied to the mixture. Temperatures, thus, can be from about 50° F. to 400° F. Preferred temperatures are from about 85 to 300° F. Although somewhat higher temperatures can be employed, temperatures should not be so high as to cause volatilization or degradation of the reactants, diluents and/or solvents, or products.

At the end of the above reaction the asymmetric alkaline earth metal salt-phosphite can be separated readily from the other materials present. However, this is not generally necessary since the small amount of water present, if not evolved during the reaction, is not deleterious in the vinyl halide polymer and in many instances will be removed during compounding and processing. Also, the water can be bound to or complexed with any free phosphite and sometimes with the asymmetric alkaline earth metal salt phosphite. The phenols produced are compatible with the vinyl halide polymers and may afford some antioxidant activity. Where diluents such as hydrocarbons and/or ethers are employed, these are also compatible with the vinyl halide polymers and can be retained.

In general, the organic phosphite, monocarboxylic acid and alkaline earth metal hydroxide are used in substantially, preferably in essentially equal, molar quantities. For example the reaction can proceed as follows:

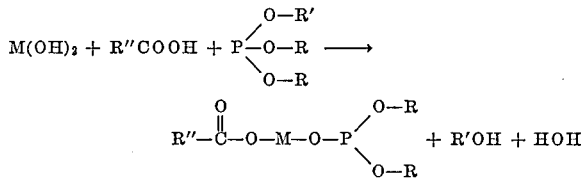

M, R and R″ have the same significance as indicated supra. R′, however, is always selected from the group consisting of aryl and alkaryl radicals.

In preparing these asymmetric stabilizers special equipment is not ordinarily required. The reactants may simply be reacted in a vessel open to the atmosphere or if desired under reflux. Inert atmospheres and so forth are not usually required. Agitation is desirable during at least a portion of the reaction. Since some of the materials used in the preparation may be flammable, such as the diluents, precautions should be observed by using water baths or steam for heating. If the exothermic heat of reaction becomes too high, cooling means should be provided.

The asymmetric alkaline earth metal salt phosphite is mixed with the vinyl halide polymer only in a minor amount by weight, alone or with other known stabilizers, sufficient to heat stabilize the vinyl halide polymer. In general, there can be used from about 0.1 to 10 parts by weight of the asymmetric alkaline earth metal salt-phosphite stabilizer of the present invention based on 100 parts by total weight of the vinyl halide polymer.

Carboxylic acids for use in reacting with the alkaline earth hydroxides can be fatty acids, aromatic acids, naphthenic acids and so forth. The acid should be one whose intermediate basic salt formed during the reaction, i.e.

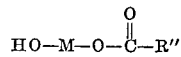

is soluble in the mixture of diluents and/or solvents. The acids have the general formula R″—COOH where R is an alkyl, cycloaliphatic, aryl, aralkyl, or alkaryl radical and their halogen substituted derivatives. The naphthenic acids are usually mixtures and can have more specific formulae as follows:

$$C_nH_{2n-2}O_2, C_nH_{2n-4}O_2 \text{ and } C_nH_{2n-6}O_2$$

where $n$ is an integer. They can be either saturated or unsaturated, but since they do not usually exhibit the characteristic reactions of alkenes, they are considered as cyclo paraffin derivatives. A typical naphthenic acid has the formula

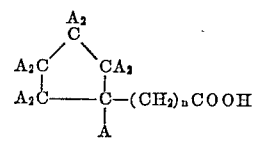

where A is H or an alkyl group and $n$ varies from 0 to 5. They can contain from about 6 to 18 carbon atoms and can have up to an average of 2.6 rings. Examples of acids used in this invention are butyric acid, valeric acid, caproic acid, caprylic acid, capric acid, 2,3-dibromobutanoic acid, isobutyric acid, lauric acid, myristic acid, palmitic acid, trimethyl acetic acid, stearic acid, isovaleric acid, benzoic acid, o-chlorobenzoic acid, phenyl butyric acid, isocaproic acid, α-naphthoic acid, 5-anthroic acid, p-toluic acid, ethyl benzoic acid, cyclobutane carboxylic acid, chloro-cyclohexane carboxylic acid, cyclopentane carboxylic acid, cyclopentyl acetic acid, 3-methyl cyclopentyl acetic acid, camphonanic acid, 4-methyl cyclohexane carboxylic acid, 2,2,6-trimethyl cyclohexane carboxylic acid, 2,3,4-trimethyl cyclopentene-3-carboxylic acid, α-campholytic acid and so forth. Mixtures of the acids can be used. The acids contain overall from 4 to 18 carbon atoms (or 3 to 17 carbon atoms plus the COOH group), and it is preferred that their halogen derivatives be monohalogen substituted and more preferably be monochloro substituted. Branch chain alkyl acids are very desirable. These acids and methods for making or obtaining them are well known to the art.

Organic phosphites for use in the practice of the present invention have the following general formula:

In the formula R is selected from the group consisting of alkyl, cycloaliphatic, aryl, aralkyl and alkaryl radicals and their halogen substituted derivatives having from 4 to 18 carbon atoms; and R' is selected from the group consisting of aryl and alkaryl radicals and their halogen substituted derivatives having from 6 to 18 carbon atoms. Mixtures of these phosphites can be used. Examples of phosphites falling within this formula are dibutyl phenyl phosphite, diheptyl phenyl phosphite, butyl diphenyl phosphite, isobutyl diphenyl phosphite, hexyl diphenyl phosphite, amyl ditolyl phosphite, triphenyl phosphite, octyl diphenyl phosphite, tris (nonyl phenyl) phosphite, trixylyl phosphite, dibenzyl phenyl phosphite, dicyclopentyl phenyl phosphite, di(cyclohexyl methyl) phenyl phosphite, di(cyclopentyl propyl) tolyl phosphite, monochlorodecyl diphenyl phosphite, trichlorophenyl phosphite, tribromo octyldecyl ditolyl phosphite, tetra fluoro octyl diphenyl phosphite, di(monofluoro octyl) naphthyl phosphite, dodecyl diphenyl phosphite, nonyl diphenyl phosphite, tetra decyl ditolyl phosphite and so forth. It is preferred that the halogen derivatives be monohalogen substituted and, more preferably, be monochloro substituted. The organic phosphites are well known to the art. They can readily be derived from mixtures of alcohols and phenols, substituted phenols and so forth by reaction with phosphorous trichloride and separating the resulting organic chloride from the organic phosphite.

Diluents can be one or more inert, relatively high boiling point hydrocarbons and/or ethers and mixtures of the same which are liquid at the reaction temperatures and which perform the function of diluent as well as solvent. Examples of the ethers and hydrocarbons which may also act as plasticizers in the vinyl halide polymer, are tripropylene glycol methyl ether, ethylene glycol monoethyl ether, ethylene glycol phenyl ether, ethylene glycol monomethyl ether, ethylene glycol monobutyl ether, diethylene glycol monomethyl ether, diethylene glycol monoethyl ether, diethylene glycol monobutyl ether, propylene glycol methyl ether, dipropylene glycol methyl ether, ethylene glycol para (sec.) butyl phenyl ether, ethylene glycol para (tert.) butyl phenyl ether, dipropylene glycol phenyl ether, propylene glycol ortho chloro phenyl ether, propylene glycol para (sec.) butyl phenyl ether, propylene glycol ortho (sec.) butyl phenyl ether, propylene glycol para (tert.) butyl phenyl ether, propylene glycol 4-biphenylyl ether, propylene glycol p-cyclohexyl phenyl ether, propylene glycol p-chloro phenyl ether, propylene glycol 2,4-dichloro phenyl ether, benzyl butyl ether, diethylene glycol diethyl ether, 2-butoxy toluene, 1-phenoxy heptane, octyl ether, toluene, cycloheptane, 3-methyl octane, ethyl benzene, the xylenes, cumene, undecane, tetralin, anisole, tert. amyl benzene, diethyl benzene, isohexyl benzene, 3-methyl biphenyl, 1,3-dimethyl cyclohexane, 2,6-dimethyl heptane, dodecane, octane, pentadecane and so forth and mixtures thereof. These diluents and/or solvents should have a boiling point of at least 230° F. For best results a mixture of the hydrocarbon and ether diluent and/or solvent should be used. Excess phosphite can be used to speed the reaction and serves to some extent as a diluent but does not avoid the necessity for using an ether and/or hydrocarbon diluent. When ethers are used alone as diluent, it is desirable to have a mixture of relatively high boiling and low boiling point ethers.

Likewise when hydrocarbons are being used alone, a mixture of relatively high and low boiling point hydrocarbons should desirably be employed. These solvents and/or diluents are employed in an amount sufficient to give the desired fluidity and solvency to the reaction mass and to facilitate handling. In general, the amount of diluent may vary from about 20 to 80% by weight of the reaction mixture. The use of these diluents, also, aids in later mixing the asymmetric stabilizers with the resin, plastisols and so forth.

An alternative method for making the asymmetric alkaline earth metal salt-phosphites is to react the starting materials in stages. This is somewhat less desirable since extra steps and extra heat are involved and sometimes the final product exhibits plate-out after extended use because of poor reaction efficiency and because more of a mixture is obtained rather than an asymmetric compound. However, such method may be more convenient to employ for some manufacturing purposes and end uses. For example, the alkaline earth metal hydroxide and the monocarboxylic acid are reacted in the diluent as follows:

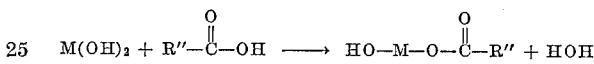

where R'' and M have the significance as defined supra. The water may or may not be separated from the resulting product. The "mixed" half salt of the metal (i.e., basic calcium octoate, basic strontium octoate, basic barium naphthenate, basic calcium benzoate, basic strontium laurate, basic barium chlorobutyrate and so forth corresponding to the foregoing metal hydroxides and monocarboxylic acids) is then reacted with the desired organic phosphite as follows:

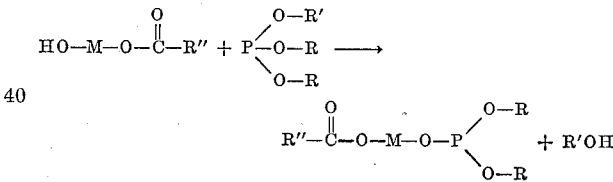

where M, R, R' and R'' have the significance as defined above. The basic alkaline earth metal salt can be obtained by the method as shown above or by any other method known to those skilled in the art. The mol ratios employed and the temperatures used are essentially the same as shown supra.

Polymers to be stabilized with the stabilizers of this invention can be any vinyl halide polymer obtained by polymerizing a polymerizable vinyl halide monomer, including mixtures of these monomers, such as vinyl fluoride, vinyl chloride, and vinyl bromide, and copolymers of a major (total) amount of one or more of these vinyl halide monomers and a minor amount, preferably not over 15%, of at least one other copolymerizable monomeric material having from one to two polymerizable $H_2C=C<$ groups. Examples of monomers copolymerizable with these vinyl halide monomer(s) in minor amounts are vinyl acetate, vinylidene fluoride, vinylidene chloride, vinylidene bromide, allyl alcohol, 3-butene-1-ol, phenyl vinyl ether, allyl acetone, diallyl phthalate, diallyl malonate, diallyl malate, diallyl phthalate, divinyl ether, trichorofluoroethylene, diallyl ether, acrylonitrile, methacrylonitrile, chloroacrylonitrile and the like and mixtures thereof. It is understood that the term "polymer" includes copolymer, interpolymer, terpolymer and graft polymer, etc. Mixtures of these polymers, copolymers, and the like can be used. Preferred are polymers prepared from vinyl chloride, or a major amount by weight of vinyl chloride and a minor amount by weight of vinylidene chloride or vinyl acetate, for example a polymer of from about 86 to 98% by weight of vinyl chloride and from about 14 to 2% by weight of vinyl acetate. The vinyl halide monomers have the formula

where X is fluorine, chlorine or bromine.

These polymers can be obtained by bulk, emulsion, solution or suspension polymerization by procedures well known to the art. The polymers to be stabilized can be any one or more of the calender grade, plastisol grade, coating grade, blotter type resins and so forth.

These stabilized vinyl halide polymers, furthermore, can be plasticized with well known plasticizers such as dioctyl phthalate, tricresyl phosphate, the nonmigratory polyester plasticizers, the Paraplexes, di-2-ethyl butyl azelate, dipropylene glycol dibenzoate, chlorinated biphenyl, epoxy type plasticizers, triethylene glycol di-(2-ethyl hexoate), chlorinated paraffin, n-butyl acetyl ricinoleate, butyl acetoxy stearate, and others well known to the art. Other stabilizers, antidegradants (antioxidants), ultra violet absorbers, fillers, rubbers, resins, pigments, dyes, fungicides and other compounding ingredients can be mixed and blended with these polymers as is customary in the art. Examples of the same are epoxidized soybean oil and other epoxidized oils and esters, the orthohydroxy benzophenones, the alkylated 2-hydroxy phenyl benzotriazoles, aryl amines, alkylated phenols, 2,6-ditertiary butyl para cresol, carbon black, titanium dioxide, magnesium oxide, antimony oxide, silica, calcium silicate, phthalocyanine blue or green, mica, wood cellulose, glass fibers, metal flakes, styrene-acrylonitrile copolymers, butadiene-acrylonitrile copolymers, rubbery polyesterurethanes, rubbery polyetherurethanes, acrylonitrile-butadiene-1,3-styrene graft polymers or copolymers and so forth, and mixtures of the same. The inorganic pigments and fillers may or may not, previous to addition, to the polymer have been treated with a coating or surface treating agent such as a halo organo silane, alcohol or polyhydroxy compound, isocyanate or polyisocyanate, amine or poly amine, etc.

As noted above the asymmetric alkaline earth metal stabilizers of this invention can be used with other known polyvinyl halide stabilizers to obtain the benefits of such known stabilizers. These other heat and light stabilizers can be any of the cadmium (II), tin (II) and zinc salts of organic acids useful as polyvinyl halide stabilizers such as cadmium oleate, (i.e., cadmium dioleate), cadmium octoate, cadmium stearate, cadmium naphthenate, cadmium laurate, cadmium 2-ethyl hexoate, stannous oleate (i.e., stannous dioleate), stannous octoate, stannous naphthenate, stannous stearate, stannous p-tert. butyl benzoate, zinc octoate (i.e., zinc dioctoate), zinc oleate, zinc naphthenate, zinc stearate, and the like, and mixtures thereof, wherein preferably each acid group attached to the metallic radical has from 6 to 18 carbon atoms. Organic phosphite stabilizers (useful among other things to stabilize against oxidation) for polyvinyl halides may also be used such as those described above (other than the asymmetric stabilizer of this invention) as well as other organic phosphites. Complex organic phosphite salts of cadmium or zinc may also be employed (for example, the reaction product of zinc oxide and dioctyl hydrogen phosphite). Each organic group of these additional organic phosphites preferably has from 4 to 18 carbon atoms. Mixtures of these additional stabilizers can be employed. These additional stabilizers together with the asymmetric stabilizer of this invention are employed in a minor amount by weight sufficient to stabilize the vinyl halide polymer. In general, the total amount of these stabilizers employed, when the asymmetric stabilizer is used with the metal salts and/or organic phosphites, is from about 0.1 to 10 parts by weight per 100 parts by weight of the vinyl halide polymer. The asymmetric stabilizer, metal salt and/or organic phosphite are used in weight ratios to each other sufficient to obtain the desired stabilizing action in the vinyl halide polymer. However, it is preferred that when the asymmetric stabilizer is used with one or more of the above metal salts, the ratio by parts by weight of the total amount of the asymmetric stabilizer to the total amount of the cadmium, tin, and/or zinc salt should be from about 1:5 to 5:1. When the asymmetric stabilizer is used with one or more organic phosphite stabilizers, the preferred ratio of parts by weight of the total amount of the asymmetric stabilizer to the total amount of the organic phosphite is from about 5:1 to 1:1. When mixtures of the metal salts and the organic phosphites are used with the asymmetric stabilizers, it is preferred that these same parts by weight ratios should apply.

The resulting stabilized polymers in suitable amounts can be dissolved in organic solvents and used for solution coating of or casting on cans, fiber containers, cardboard boxes, and the like. The polymers can be made into films or sheets for packaging purposes (bread wrappers), shower curtains and the like; can be printed with decorative colors and used as wall coverings; can be used as a backing material in the manufacture of pressure sensitive adhesive tapes; can be calendered into woven or non-woven fabric of synthetic or natural fibers to make upholstery material or luggage; can be used in the manufacture of cable jackets or electric wire insulation; can be used to make refrigerator and window gaskets; can be used in making toys and athletic goods, etc. Also, the stabilized vinyl halide polymers of this invention, particularly the vinyl chloride-vinyl acetate copolymers, are particularly useful in making floor tiles, phonograph records and so forth. The stabilized polymers of the present invention are especially useful in making plastisols which can be very liquid casting compositions or non-dripping dipping compositions. By use of suitable inert diluents or extenders known to the art these stabilized resins usually in the form of plastisols can be made into organosols. Furthermore, these stabilized vinyl halide polymers can also be compounded to form impact resistant, rigid polyvinyl chloride articles using appropriate amounts of polyurethanes, or styrene-acrylonitrile copolymers and/or butadiene-acrylonitrile copolymers, or acrylonitrile-butadiene-styrene copolymers, etc., in order to make tubing, pipes, trays and so forth.

These compounding ingredients are employed in amounts well known to those skilled in the art.

The stabilizers of the present invention as well as the other compounding ingredients can be mixed with the vinyl halide polymer on a rubber mill or in a Banbury or extruder at temperatures of 275 to 350° F. or dispersed in the vinyl halide polymer including plasticizer, pigment, etc., and cast or fused and cured at 275 to 350° F. as known to the art. In general, the temperatures and times used for mixing, fusing and/or curing are those necessary to obtain the desired blending or mixing of the ingredients and desired physical properties without causing appreciable degradation of the vinyl halide polymer as is well known to those skilled in the art. They may also be mixed with the vinyl halide polymer in solvent and the solvent evaporated therefrom. They can also be mixed with suspension of latex of the vinyl halide polymer and the water removed by filtration or after coagulation, but this is not too desirable as it may be difficult to get the desired amount of stabilizer in or on the polymer and some may be lost in the water. These asymmetric stabilizers can also be added initially or during polymerization of the vinyl halide polymer although care should be exercised since their addition during polymerization may affect conversion rates, molecular weight, particle size, and so forth.

The following examples, in which all parts are parts by weight, will serve to illustrate the present invention with more particularity to those skilled in the art:

Example I.—Preparation of calcium-octoate-diphenyl phosphite 50 parts of calcium hydroxide were dispersed in a mixture of 98 parts of tripropylene glycol methyl ether and 137 parts of triphenyl phosphite in a flask at a temperature of from about 60 to 70° F. Then there were rapidly added to the resulting mixture in the flask under good agitation 98 parts of 2-ethyl hexoic acid. The temperature of the mixture in the flask rose to 160° F. External heat was applied to the flask to raise the temperature of the mixture to about 240° F. When the temperature of the mixture reached from about 190 to 200° F., the mixture thickened considerably. External heat was removed as soon as the mixture was too viscous for stirring, and the mixture was allowed to stand undisturbed while cooling for about one hour after which the mixture thinned out. The mixture was then stirred and heated at 240° F. when the reaction ceased, and it was filtered to remove unreacted oxides and hydroxides. The resulting solution or filtrate of the ether and excess phosphite contained about 6.3% (some loss occurred) by weight of calcium as calcium octoate-diphenyl phosphite,

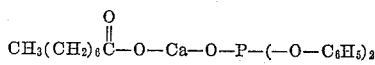

Of the total weight of starting materials employed, i.e., 383 parts, the resulting solution or filtrate contained approximately 209 parts of calcium octoate-diphenyl phosphite (M.W.—approx. 416). The efficiency of the reaction was about 90%.

Example II.—Preparation of calcium octoate-octyl phenyl phosphite

The method of this example was similar to Example I above. 41.3 parts of calcium hydroxide were dispersed in a flask containing a mixture of 95.2 parts of ethylene glycol monoethyl ether and 40 parts of a principally aliphatic hydrocarbon solvent having a boiling point over 300° F. at a temperature of from 60 to 70° F. along with 98 parts of octyl diphenyl phosphite (added at about same time as the calcium hydroxide). 80.5 parts of 2-ethyl hexoic acid were next added rapidly with good agitation. The temperature of the resulting mixture rose to about 130° F. External heat was then applied to the flask to raise the temperature of the mixture to 240° F. When the temperature of the mixture reached about 190–200° F., the mixture thickened. Heat was removed and the mixture allowed to stand for about an hour undisturbed. After the mixture thinned out or its viscosity dropped, the mixture was then stirred and heated to 240° F. and then filtered hot. The resulting solution of ether, hydrocarbon and excess phosphite contained about 6.6% calcium as calcium octoate-octyl phenyl phosphite,

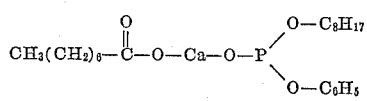

Example III.—Preparation of calcium octoate-bis(nonyl phenyl) phosphite

The method of this example was similar to that of Example I above. 41.3 parts of calcium hydroxide were dispersed in a mixture of 76.2 parts of ethylene glycol monoethyl ether and 82 parts of the hydrocarbon solvent of Example II above in a flask at a temperature of from 60 to 70° F. along with 194.0 parts of tris (nonyl phenyl) phosphite (added at the same time as the calcium hydroxide). 81 parts of octoic acid were next added rapidly with good agitation. The temperature of the resulting mixture then rose to about 160° F. External heat was then applied to the flask to raise the temperature of the mixture to about 240° F. When the temperature of the mixture reached 190–200° F., the mixture thickened. External heat was removed, and the flask and its contents were allowed to stand undisturbed for about one hour, after which the mixture thinned out. The mixture was then stirred while being heated to 240° F. and filtered. The ether and hydrocarbon filtrate or solution obtained contained about 4.6% calcium as calcium octoate-bis (nonyl phenyl) phosphite,

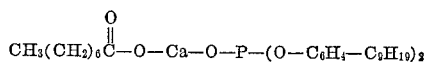

Example IV.—Preparation of barium naphthenate-octyl phenyl phosphite

This method was similar to the previous examples. 105 parts of barium hydroxide monohydrate were dispersed in a flask containing a mixture at 90° F. of 36 parts of tripropylene glycol methyl ether, 40 parts of ethylene glycol monoethyl ether and 140 parts of a high boiling point hydrocarbon solvent (similar to Example II above), along with 98 parts of octyl diphenyl phosphite. Then 138 parts of naphthenic acid having an acid value equal to 229 were added rapidly under good agitation. The temperature of the resulting mixture rose to 130° F. External heat was then applied to the flask to raise the temperature of the mixture to about 240° F. When the temperature of the mixture reached about 190–200° F., the mixture thickened considerably. External heat was removed, and the mixture allowed to stand undisturbed for about one hour, after which the mixture thinned out. The mixture was next stirred while being heated to 240° F. and filtered. The filtrate or solution of ethers and hydrocarbon contained about 13% barium as barium naphthenate-octyl phenyl phosphite.

Example V.—Preparation of strontium octoate-octyl phenyl phosphite

The method of this example was the same as that of Example II above, except that strontium hydroxide was used in place of calcium hydroxide. The resulting filtrate or solution contained similar amounts of strontium as strontium octoate-octyl phenyl phosphite,

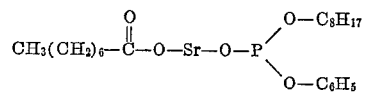

Example VI

About 100 parts of emulsion polymerized plastisol grade polyvinyl chloride resin (Geon 121) were mixed with 65 parts of dioctyl phthalate and 2 parts of the resulting filtrate or solution of Example I above, containing 6.3% Ca as calcium octoate-diphenyl phosphite. A portion of the resulting plastisol was cast as a film on a highly polished chrome plated steel plate (2 sq. in.) and cured (and fused) at 350° F. for 10 minutes. The cured film was then stripped from the plate, and the surface of the chrome plate was visibly examined for plate-out (a misty appearance or deposit). There was no plate-out. This procedure was repeated on the same plate for a total of twenty times. After these twenty runs, there still was no plate-out.

Example VII

The method of this example was the same as that of Example VI above, except that an equivalent amount of calcium octoate was used in place of an equivalent amount of the calcium octoate residue in the calcium octoate-diphenyl phosphite in the resulting filtrate or solution of Example I above, and no organic phosphite was used. After separately casting and curing the plastisol for only three times, the chrome plate showed evidence of plate-out (deposits). No further runs were then made.

Example VIII

The method of this example was the same as that of Example VI above, except that an equivalent amount of calcium octoate was used in place of an equivalent amount of the calcium octoate residue in the calcium octoate-diphenyl phosphite in the resulting filtrate or solution of Example I above. Also, triphenyl phosphite in an amount equivalent to the phosphite residue in the calcium octoate-diphenyl phosphite of Example I above was added to the plastisol. After separately casting and curing the plastisol for only three times, the chrome plate showed evidence of plate-out (deposits on the surface). After these three runs, no further runs were made.

*Example IX*

The method of this example was the same as that of Example VI above, except that in place of the calcium octoate-diphenyl phosphite filtrate or solution there was used in different tests (A) an equivalent of the calcium octoate-octyl phenyl phosphite filtrate or solution of Example II above, (B) an equivalent of the calcium octoate-bis (nonyl phenyl) phosphite of Example III above, (C) an equivalent of the barium naphthenate-octyl phenyl phosphite filtrate or solution of Example IV above, and (D) an equivalent of the strontium octoate-octyl phenyl phosphite solution of Example V above. In each instance after 20 separate runs with each of the formulations (A) to (D), there was no plate-out on the chrome plated steel sample.

Tests, also, were conducted in which plastisols were prepared according to the methods of Examples VI and IX above, except that they contained additionally cadmium 2-ethyl hexoate and zinc stearate as additional conventional color stabilizers in suitable amounts. The resulting plastisols were cast, cured, stripped and samples cut from the strips and place in a Fade-Ometer (Atlas Electric Devices Co.) and subjected to ultra-violet light for 40 hours. Control samples were prepared and tested in the same way in the Fade-Ometer. The control samples were compounded in the same fashion as the test samples except that in place of the asymmetrical alkaline earth metal salt-phosphites of the present invention, there were used equivalent amounts of the free corresponding alkaline earth metal carboxylic acid salt and the free phosphite from which the asymmetric compounds of the present invention were made. The results of the accelerated light exposure tests showed that the cured plastisol films of the present invention exhibited the same resistance to discoloration as did the control samples. However, unlike the control samples, the surfaces of the polyvinyl chloride films containing the asymmetric stabilizers of the present invention were not slippery or slimy. Moreover, polyvinyl chloride films stabilized with the asymmetric stabilizers of this invention could easily be printed and heat sealed while polyvinyl chloride films containing mixtures of alkaline earth metal dicarboxylates and phosphites, where the carboxylate and phosphites were the same as those used in making the asymmetric stabilizers, were printed and heat sealed only with difficulty.

While the present invention has been described with particular reference to the prevention of heat degradation of vinyl halide polymers by incorporating therewith the novel asymmetric alkaline earth-carboxylic acid-phosphite compounds disclosed herein, it will be appreciated that minor amounts of such asymmetric compound (alone or with other antidegradants) can be used likewise to retard or prevent degradation of organic substances subject to degradation (by heat, light, ozone, etc.) like the polystyrenes, polyethylene, polypropylene, ethylene-propylene copolymers, ethylene-propylene copolymers containing unsaturation, poly (cis) butadiene - 1,3 having various amounts of 1,2 and 1,4 configuration (Ziegler type as well as polybutadienes made by other methods), butadiene-styrene copolymers (resinous and rubbery), acrylonitrile-butadiene-styrene type copolymers and grafts, synthetic natural rubber and/or balata (cis/trans Ziegler or other type polymers), butyl rubber, polyesterurethanes, polyetheruethanes, polyether-ester urethanes, poly amides, nylon, butadiene-acrylonitrile type rubbers (Hycar or Paracril), neoprene, polyesters (Paraplexes, Dacron, etc.), chlorinated rubber, silicone rubbers, polyether rubbers and plastics, acrylates and methacrylates and their copolymers, alkyd resins, phenolformaldehyde type resins, melamine type resins, the cellulosics, the monomers used to prepare such polymers, greases, natural rubber, balata, pine oils, terpenes, lubricating oils, fuel oils, gasoline, vegetable oils, and so forth, either alone, mixed with each other or with the vinyl halide polymer or copolymer. These asymmetric compounds are useful as well as a treating agent for other natural and synthetic organic materials.

It, furthermore, is to be understood that in accordance with the provisions of the patent laws and statutes, the particular compounds, compositions, products and methods shown and described herein are presented for purposes of explanation and illustration and that various changes and modifications of said compounds, compositions, products and methods can be made without departing from this invention.

What is claimed is:

1. A composition comprising a vinyl halide polymer containing a minor amount by weight sufficient to heat stabilize said polymer of at least one compound having the general formula

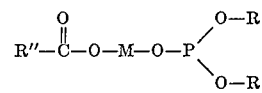

where R and R'' are selected from the group consisting of alkyl, cycloaliphatic, aryl, aralkyl, and alkaryl radicals and their halogen substituted derivatives, where R has from 4 to 18 carbon atoms, where R'' has from 3 to 17 carbon atoms, and where M is selected from the group consisting of barium, calcium, and strontium.

2. A composition according to claim 1 where said compound is used in an amount of from about 0.1 to 10 parts by weight per 100 parts by weight of said polymer.

3. A composition according to claim 2 where M is barium.

4. A composition according to claim 3 where said compound is barium naphthenate-octyl phenyl phosphite.

5. A composition according to claim 2 where M is calcium.

6. A composition according to claim 5 where said compound is calcium octoate-diphenyl phosphite.

7. A composition according to claim 5 where said compound is calcium octoate-octyl phenyl phosphite.

8. A composition according to claim 5 where said compound is calcium octoate-bis (nonyl phenyl) phosphite.

9. A composition according to claim 2 where M is strontium.

10. A composition according to claim 9 where said compound is strontium octoate-octyl phenyl phosphite.

11. A composition comprising a vinyl halide polymer containing a minor amount by weight sufficient to heat stabilize said polymer of a material comprising (1) at least one compound having the general formula

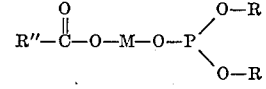

where R and R'' are selected from the group consisting of alkyl, cycloaliphatic, aryl, aralkyl, and alkaryl radicals and their halogen substituted derivatives, where R has from 4 to 18 carbon atoms, where R'' has from 3 to 17 carbon atoms, and where M is selected from the group consisting of barium, calcium, and strontium, and (2) at least one compound selected from the group consisting of (A) and (B), where (A) is at least one compound selected from the group consisting of cadmium, stannous, and zinc salts of monocarboxylic acids, and where (B) is at least one neutral organic phosphite other than (1), the weight ratio of the total of component (1) to the total of component (2) being from 1:5 to 5:1.

12. A composition comprising (I) a vinyl halide polymer containing (II), a stabilizing material comprising
(1) at least one compound having the general formula $$R''-\overset{O}{\underset{\|}{C}}-O-M-O-P\underset{O-R}{\overset{O-R}{\diagup}}$$

where R and R'' are selected from the group consisting of alkyl, cycloaliphatic, aryl, aralkyl, and alkaryl radicals and their halogen substituted derivatives, where R has from 4 to 18 carbon atoms, where R'' has from 3 to 17 carbon atoms, and where M is selected from the group consisting of barium, calcium, and strontium, and
(2) at least one compound selected from the group consisting of cadmium, stannous, and zinc salts of monocarboxylic acids, where each carboxylic acid group attached to the metal of (2) has from 6 to 18 carbon atoms, where (II) is used in an amount of from about 0.1 to 10 parts by weight per 100 parts by weight of (I), and where the parts by weight ratio of (1) to (2) is about 1:5 to 5:1.

13. A composition comprising (I) a vinyl halide polymer containing (II) a stabilizing material comprising
(1) at least one compound of the general formula $$R''-\overset{O}{\underset{\|}{C}}-O-M-O-P\underset{O-R}{\overset{O-R}{\diagup}}$$

where R and R'' are selected from the group consisting of alkyl, cycloaliphatic, aryl, aralkyl, and alkaryl radicals and their halogen substituted derivatives, where R has from 4 to 18 carbon atoms, where R'' has from 3 to 17 carbon atoms, and where M is selected from the group consisting of barium, calcium and strontium, and
(2) at least one neutral organic phosphite other than (1) and wherein each organic group of said phosphite has from 4 to 18 carbon atoms, where (II) is used in an amount of from about 0.1 to 10 parts by weight per 100 parts by weight of (I), and where the parts by weight ratio of (1) to (2) is about 5:1 to 1:1

14. A composition comprising (I) a vinyl halide polymer containing (II) a stabilizing material comprising
(1) at least one compound of the general formula $$R''-\overset{O}{\underset{\|}{C}}-O-M-O-P\underset{O-R}{\overset{O-R}{\diagup}}$$

where R and R'' are selected from the group consisting of alkyl, cycloaliphatic, aryl, aralkyl, and alkaryl radicals and their halogen substituted derivatives, where R has from 4 to 18 carbon atoms, where R'' has from 3 to 17 carbon atoms, and where M is selected from the group consisting of barium, calcium and strontium,
(2) at least one compound selected from the group consisting of cadmium, stannous, and zinc salts of monocarboxylic acids, where each carboxylic acid group attached to the metal of (2) has from 6 to 18 carbon atoms, and
(3) at least one neutral organic phosphite other than (1) and wherein each organic group of said phosphite has from 4 to 18 carbon atoms, where (II) is used in an amount of from about 0.1 to 10 parts by weight per 100 parts by weight of (I), where the parts by weight ratio of (1) to (2) is about 1:5 to 5:1, and where the parts by weight ratio of (1) to (3) is about 5:1 to 1:1.

15. A vinyl chloride polymer containing a minor amount by weight sufficient to retard heat degradation of said polymer of a compound having the general formula $$R''-\overset{O}{\underset{\|}{C}}-O-M-O-P\underset{O-R}{\overset{O-R}{\diagup}}$$

where R and R'' are selected from the group consisting of alkyl, cycloaliphatic, aryl, aralkyl, and alkaryl radicals and their halogen substituted derivatives, where R has from 4 to 18 carbon atoms, where R'' has from 3 to 17 carbon atoms, and where M is selected from the group consisting of barium, calcium, and strontium.

References Cited by the Examiner

UNITED STATES PATENTS

| | | | |
|---|---|---|---|
| 2,564,646 | 8/1951 | Leistner et al. | 260—45.7 |
| 2,728,789 | 12/1955 | Morris et al. | 260—461 |
| 2,867,594 | 1/1959 | Hansen et al. | 260—23 |
| 2,894,923 | 7/1959 | Graham | 260—23 |
| 2,997,454 | 8/1961 | Leistner et al. | 260—45.75 |
| 3,030,334 | 4/1962 | Canarios et al. | 260—45.75 |
| 3,139,450 | 6/1964 | Friedman | 260—461 |

LEON J. BERCOVITZ, *Primary Examiner.*

DONALD E. CZAJA, *Examiner.*

R. A. WHITE, *Assistant Examiner.*